United States Patent
Cho

(10) Patent No.: US 10,975,965 B2
(45) Date of Patent: Apr. 13, 2021

(54) POSITION LEARNING SYSTEM FOR ELECTRIC SHIFT-BY-WIRE SYSTEM

(71) Applicant: Hyundai Kefico Corporation, Gyeonggi-do (KR)

(72) Inventor: Hyoung Sang Cho, Anyang-Si (KR)

(73) Assignee: HYUNDAI AUTRON CO., LTD., Seoul (KR)

(*) Notice: Subject to any disclaimer, the term of this patent is extended or adjusted under 35 U.S.C. 154(b) by 0 days.

(21) Appl. No.: 16/663,235

(22) Filed: Oct. 24, 2019

(65) Prior Publication Data

US 2020/0132191 A1 Apr. 30, 2020

(30) Foreign Application Priority Data

Oct. 29, 2018 (KR) ........................ 10-2018-0130066

(51) Int. Cl.
| | | |
|---|---|---|
| *F16H 63/38* | (2006.01) | |
| *F16H 63/34* | (2006.01) | |
| *F16H 61/28* | (2006.01) | |
| *F16H 59/08* | (2006.01) | |

(52) U.S. Cl.
CPC ......... *F16H 63/3466* (2013.01); *F16H 63/38* (2013.01); *F16H 2059/086* (2013.01); *F16H 2061/283* (2013.01)

(58) Field of Classification Search
CPC .............. F16H 63/38; F16H 2061/283; F16H 2059/086; F16H 61/28; F16H 2061/0087; F16H 61/65; F16H 94/0204; F16H 59/044; F16H 61/24; F16H 2061/243; F16H 2061/326

USPC ...................................................... 701/59, 64
See application file for complete search history.

(56) References Cited

U.S. PATENT DOCUMENTS

| | | | | |
|---|---|---|---|---|
| 2002/0019287 A1* | 2/2002 | Ebashi | ................... | F16H 61/32 |
| | | | | 475/254 |
| 2005/0151492 A1* | 7/2005 | Nakai | ................... | H02P 5/747 |
| | | | | 318/432 |
| 2017/0307072 A1* | 10/2017 | Yamada | ................. | F16H 61/32 |
| 2020/0011414 A1* | 1/2020 | Sakaguchi | ............. | F16H 61/32 |
| 2020/0166122 A1* | 5/2020 | Yamamoto | ............... | G05G 1/08 |

FOREIGN PATENT DOCUMENTS

| | | |
|---|---|---|
| JP | 05-010435 A | 1/1993 |
| JP | 2002-048230 A | 2/2002 |
| JP | 2003-113936 A | 4/2003 |

(Continued)

*Primary Examiner* — Roger L Pang
(74) *Attorney, Agent, or Firm* — Morgan, Lewis & Bockius LLP

(57) ABSTRACT

The present invention relates to a position learning system for an electric shift-by-wire system, which senses changes in the load of a motor according to operations of a four-stage detent plate and a detent spring to learn positions of shift stages of the electric shift-by-wire system, the position learning system including: a sensor for sensing the current generated from the motor; and a controller for receiving current data until a shift stage P is switched to a shift stage D or the shift stage D is switched to the shift stage P from the sensor, learning positions of shift stages R and N through the received current data, and performing offset operations on the basis of the learned positions of the shift stages R and N to learn positions of the shift stages P and D.

8 Claims, 6 Drawing Sheets

(56) References Cited

FOREIGN PATENT DOCUMENTS

| | | |
|---|---|---|
| JP | 2004-092773 A | 3/2004 |
| JP | 2004-308752 A | 11/2004 |
| JP | 2009-115219 A | 5/2009 |
| JP | 2010-019368 A | 1/2010 |
| JP | 4868655 B2 | 2/2012 |
| JP | 2013-064469 A | 4/2013 |
| JP | 2015-107669 A | 6/2015 |
| JP | 2018-048662 A | 3/2018 |
| KR | 10-2003-0016662 A | 3/2003 |

* cited by examiner

POSITION LEARNING SYSTEM FOR ELECTRIC SHIFT-BY-WIRE SYSTEM

CROSS REFERENCE TO RELATED APPLICATION OF THE INVENTION

The present application claims the benefit of Korean Patent Application No. 10-2018-0130066 filed in the Korean Intellectual Property Office on Oct. 29, 2018, the entire contents of which are incorporated herein by reference.

BACKGROUND OF THE INVENTION

Field of the Invention

The present invention relates to a position learning system for an electric shift-by-wire system, and more particularly, to a position learning system for an electric shift-by-wire system that is capable of sensing variations in the amount of current generated from a motor according to changes in the load of the motor caused by an external force of a detent spring produced by a gap between a detent plate having hills and valleys formed on shift stages thereof and the detent spring, learning positions of the motor corresponding to the shift stages R and N, and performing offset operations at the learned positions of the shift stages R and N to recognize positions of shift stages P and D.

Background of the Related Art

A transmission is an essential part of a vehicle for increasing or decreasing a rotational force of an engine according to a driving state of the vehicle to transfer power generated from the engine to wheels.

The transmission is classified into a manual transmission and an automatic transmission according to shifting methods, and since the automatic transmission performs soft launch and is convenient in control, without any separate control of a clutch, recently, most of vehicles adopt the automatic transmission.

At this time, driving modes of the automatic transmission are determined by a shift-by-wire system, and the shift-by-wire system is divided into a mechanical shift-by-wire system which performs shifting through a mechanical link structure using wires and an electric shift-by-wire system which performs shifting through electrical signals using a substrate, instead of the mechanical link structure.

Unlike the mechanical shift-by-wire system, the electric shift-by-wire system transfers information on the shift stage selected by a driver as an electrical signal, without any mechanical connection between the transmission and a shift lever, thereby generating no impact and vibrations, and also simplifies connection means between a lever device and the transmission, thereby preventing gear shifting due to the movement of the lever. Even if the electric shift-by-wire system has a high price, accordingly, the number of vehicles adopting the electric shift-by-wire system becomes gradually increased.

So as to perform stable shift control in such electric shift-by-wire system, it is important to recognize a position of the motor, and accordingly, conventional electric shift-by-wire systems have tried to recognize a position of the motor through a hall sensor attached to an interior of the motor. However, the hall sensor measures only the relative angle of rotation of the motor and does not measure the absolute angle of rotation of the motor, thereby making it hard to recognize an accurate position of the motor.

So as to solve the above-mentioned problems, a try to measure an absolute angle of rotation or position of the motor has been suggested by attaching a non-contact type position sensor used in a manual shift lever to the motor, but in this case, an updating speed of a phase width modulation (PWM) signal outputted from the non-contact type position sensor is low. Even in the measurement using the non-contact type position sensor, accordingly, it is hard to recognize an accurate position of the motor.

Further, in the conventional practice, a method for recognizing a position of a motor has been suggested by rotating the motor to allow a detent plate to be not moved anymore by a wall, checking a time point at which a change is sensed by a hall sensor, and learning an absolute position of the motor on the basis of the time point. Even in the conventional method, however, it is necessary to forcedly drive the motor so as to learn the position of the motor, which undesirably needs separate time in learning the position of the motor.

In detail, accurate recognition for a present position of the motor is a main subject in the technology for the vehicle adopting the electric shift-by-wire system, but through the methods suggested in the conventional practices, it is hard to recognize the position of the motor in a simple and accurate manner. Therefore, there is a need for a new system capable of more accurately recognizing a position of the motor so as to enhance the performance of the electric shift-by-wire system.

SUMMARY OF THE INVENTION

Accordingly, the present invention has been made in view of the above-mentioned problems occurring in the related art, and it is an object of the present invention to provide a position learning system for an electric shift-by-wire system that is capable of sensing variations in the amount of current generated from a motor according to changes in the load of the motor caused by an external force of a detent spring produced by a gap between a detent plate having hills and valleys formed on shift stages thereof and the detent spring, learning positions of the motor corresponding to the shift stages R and N, and performing offset operations at the learned positions of the shift stages R and N to recognize positions of shift stages P and D.

To accomplish the above-mentioned object, according to one aspect of the present invention, there is provided a position learning system for an electric shift-by-wire system, which senses changes in the load of a motor according to operations of a four-stage detent plate and a detent spring to learn positions of shift stages of the electric shift-by-wire system, the position learning system including: a sensor for sensing the current generated from the motor; and a controller for receiving current data until a shift stage P is switched to a shift stage D or the shift stage D is switched to the shift stage P from the sensor, learning positions of shift stages R and N through the received current data, and performing offset operations on the basis of the learned positions of the shift stages R and N to learn positions of the shift stages P and D.

According to the present invention, desirably, the controller includes: a data receiving part for calculating a low point and a high point of the current data on the basis of the current data received from the sensor to determine whether the calculated low point and high point of the current data are reasonable data; a learning part for learning the positions of the shift stages R and N through the low point of the current data if it determined through the data receiving part that the low point and the high point of the current data are reasonable data; and an operation part for performing the offset operations by set values at the positions of the shift stages R and N learned by the learning part to learn the positions of the shift stages P and D.

According to the present invention, desirably, the data receiving part determines that the low point and high point of the current data are reasonable data if the calculated low point and high point of the current data are positioned within a predetermined allowable range.

To accomplish the above-mentioned object, according to another aspect of the present invention, there is provided a position learning system for an electric shift-by-wire system, which senses changes in the load of a motor according to operations of a two-stage detent plate and a detent spring to learn positions of shift stages of the electric shift-by-wire system, the position learning system including: a sensor for sensing the current generated from the motor; and a controller for receiving current data until a shift stage P is switched to a shift stage which is not the shift stage P or the shift stage which is not the shift stage P is switched to the shift stage P from the sensor, learning the position of a hill of the detent plate through the received current data, and performing offset operations on the basis of the learned position of the hill of the detent plate to learn positions of the shift stages P and the shift stage which is not the shift stage P.

According to the present invention, desirably, the controller includes: a data receiving part for calculating a low point and a high point of the current data on the basis of the current data received from the sensor to determine whether the calculated low point and high point of the current data are reasonable data; a learning part for learning the position of the hill of the detent plate through the high point of the current data if it determined through the data receiving part that the low point and the high point of the current data are reasonable data; and an operation part for performing the offset operations by set values at the position of the hill learned by the learning part to learn the positions of the shift stage P and the shift stage which is not the shift stage P.

According to the present invention, desirably, the data receiving part determines that the low point and high point of the current data are reasonable data if the calculated low point and high point of the current data are positioned within a predetermined allowable range.

According to the present invention, desirably, the operation part performs the offset operation by a first value to the left side from the learned position of the hill of the detent plate to learn the position of the shift stage P and performs the offset operation by a second value to the right side from the learned position of the hill of the detent plate to learn the position of the shift stage which is not the shift stage P.

To accomplish the above-mentioned object, according to yet another aspect of the present invention, there is provided a position learning system for an electric shift-by-wire system, which senses changes in the load of a motor according to operations of a four-stage detent plate and a detent spring to learn positions of shift stages of the electric shift-by-wire system, the position learning system including: a sensor for sensing the current generated from the motor; and a controller for receiving current data until the shift stage P is switched to the shift stage D and the shift stage D is switched back to the shift stage P from the sensor, learning positions of shift stages R and N through the current data at the time when the shift stage P is switched to the shift stage D and the current data at the time when the shift stage D is switched back to the shift stage P, and performing offset operations on the basis of the learned positions of the shift stages R and N to learn positions of the shift stages P and D.

According to the present invention, desirably, the controller includes: a data receiving part for calculating a low point and a high point of the current data on the basis of the current data received from the sensor to determine whether the calculated low point and high point of the current data are reasonable data; a learning part for learning the positions of the shift stages R and N through the low point of the current data if it determined through the data receiving part that the low point and the high point of the current data are reasonable data; and an operation part for performing the offset operations by set values at the positions of the shift stages R and N learned by the learning part to learn the positions of the shift stages P and D.

According to the present invention, desirably, the learning part learns positions of a first shift stage R and a first shift stage N on the basis of the current data until the shift stage P is switched to the shift stage D, learns positions of a second shift stage R and a second shift stage N on the basis of the current data until the shift stage D is switched back to the shift stage P, and calculates average values between the first shift stages R and N and the second shift stages R and N to learn positions of final shift stages R and N.

According to the present invention, desirably, the operation part performs the offset operation by a first value to the left side from the learned position of the shift stage R to learn the position of the shift stage P and performs the offset operation by a second value to the right side from the learned position of the shift stage N to learn the position of the shift stage D.

BRIEF DESCRIPTION OF THE DRAWINGS

The above and other objects, features and advantages of the present invention will be apparent from the following detailed description of the embodiments of the invention in conjunction with the accompanying drawings, in which.

DETAILED DESCRIPTION OF THE EMBODIMENTS

Figure 1:
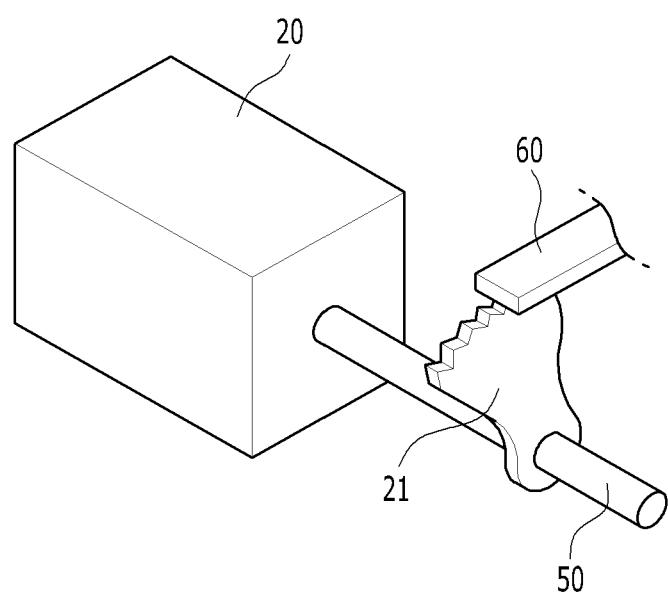
FIG. 1 is a perspective view showing a detent plate fitted to a rotary shaft of a motor and a detent spring moving along with the detent plate.

The present invention is disclosed with reference to the attached drawings wherein the corresponding parts in the embodiments of the present invention are indicated by corresponding reference numerals. If it is determined that the detailed explanation on the well known technology related to the present invention makes the scope of the present invention not clear, the explanation will be avoided for the brevity of the description.

When it is said that one element is described as being "connected" or "coupled" to the other element, one element may be directly connected or coupled to the other element, but it should be understood that another element may be present between the two elements. In the description, when it is said that one member is located "above" or "under" another member, it means that one member may come into contact with another member as well as yet another member may exist between the two members.

In this application, terms, such as "comprise", "include", or 'have', are intended to designate those characteristics, numbers, steps, operations, elements, or parts which are described in the specification, or any combination of them that exist, and it should be understood that they do not preclude the possibility of the existence or possible addition of one or more additional characteristics, numbers, steps, operations, elements, or parts, or combinations thereof.

In the description, also, it should be understood that a term 'system' includes a single system having a plurality of parts.

Before the present invention is described, first, an explanation on a conventional electric shift-by-wire system will be briefly given with reference to FIGS. 1 and 2.

Figure 2A:
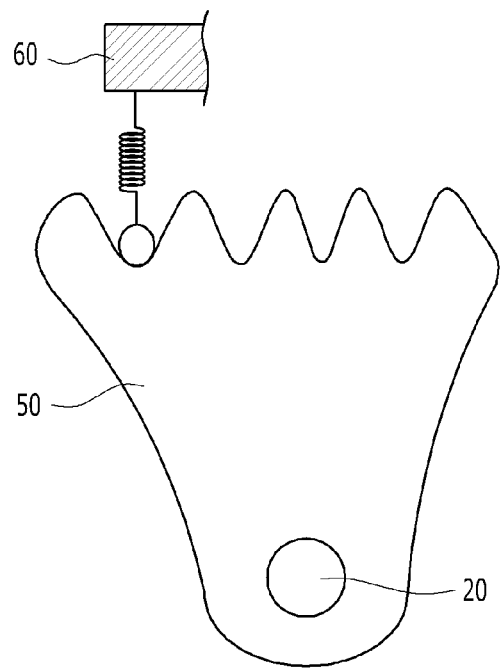
FIG. 2A is a front view showing a state where the detent spring is located at a valley of the detent plate to apply a pressurizing force to the detent plate.
Figure 2B:
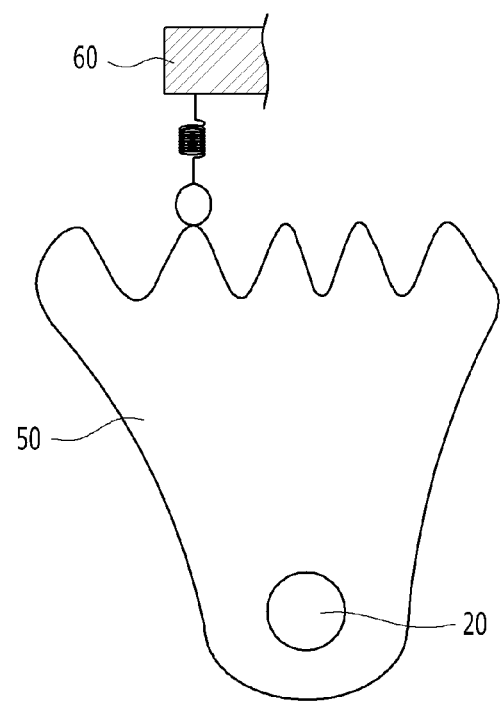
FIG. 2B is a front view showing a state where the detent spring is located at a hill of the detent plate and is then pressurized against the hill of the detent plate.

FIG. 1 is a perspective view showing a detent plate fitted to a rotary shaft of a motor and a detent spring moving along with the detent plate, FIG. 2A is a front view showing a state where the detent spring is located at a valley of the detent plate to apply a compression force to the detent plate, and FIG. 2B is a front view showing a state where the detent spring is located at a hill of the detent plate and is then compressed against the hill of the detent plate.

The electric shift-by-wire system is a system which recognizes control of a gear selector 10 (shift lever) by a driver and rotates a motor on the basis of the recognized control of the gear selector 10 to switch shift stages of a transmission 30, and so as to switch shift stages of a vehicle, as shown in FIG. 1, the electric shift-by-wire system makes use of a detent plate 50 fittedly coupled to a rotary shaft 21 of a motor 20 in such a manner as to rotate according to the rotation of the motor 20 and a detent spring 60 moving in upward and downward directions by the rotation of the detent plate 50.

Like this, the electric shift-by-wire system rotates the detent plate 50 fittedly coupled to the rotary shaft 21 of the motor 20 to switch the shift stages, and accordingly, it is important to recognize a position (an angle of rotation) of the motor 20. To do this, generally, the electric shift-by-wire system makes use of a hall sensor attached to the motor.

In this case, the hall sensor measures the position (angle of rotation) of the motor by counting moments passing a hall element, and accordingly, it measures only the relative angle of rotation of the motor, so that it cannot recognize an absolute angle of rotation of the motor, thereby making it difficult to perform accurate shift control in the conventional electric shift-by-wire system.

So as to solve the above-mentioned problems, in the conventional practice, a method for recognizing a position of a motor has been suggested by rotating the motor to allow a detent plate to be stopped by a wall, checking a time point at which a change is sensed by a hall sensor after the detent plate has been not moved anymore, and learning an absolute position of the motor on the basis of the time point. Even in the above conventional method, however, it is necessary to drive the motor so as to learn the position of the motor, which undesirably needs separate time in learning the position of the motor, so that it is hard to recognize the position of the motor in simple and accurate manners.

As shown in FIG. 2A, the detent spring 60 is not pressurized at the time when it is located at the valley of the detent plate 50, thereby applying a relatively small load to the motor, but as shown in FIG. 2B, the detent spring 60 is pressurized at the time when it is located at the hill of the detent plate 50, thereby applying a relative large load to the motor. According to the present invention, it is noted that a current generated from the motor at the time when the detent spring 60 is located at the hill of the detent plate 50 is greater than that at the time when the detent spring 60 is located at the valley of the detent plate 50, and as a result, there is provided a position learning system for an electric shift-by-wire system that is capable of learning accurate positions of the motor 20 corresponding to shift stages (stages P (parking), R (reverse), N (neutral) and D (drive)) on the basis of the changes in the amount of current generated from the motor 20, without having any additional sensor or while the motor 20 is being not driven separately.

Hereinafter, an explanation on a position learning system for an electric shift-by-wire system according to a first embodiment of the present invention will be in detail given with reference to FIGS. 3 to 5.

Figure 3:
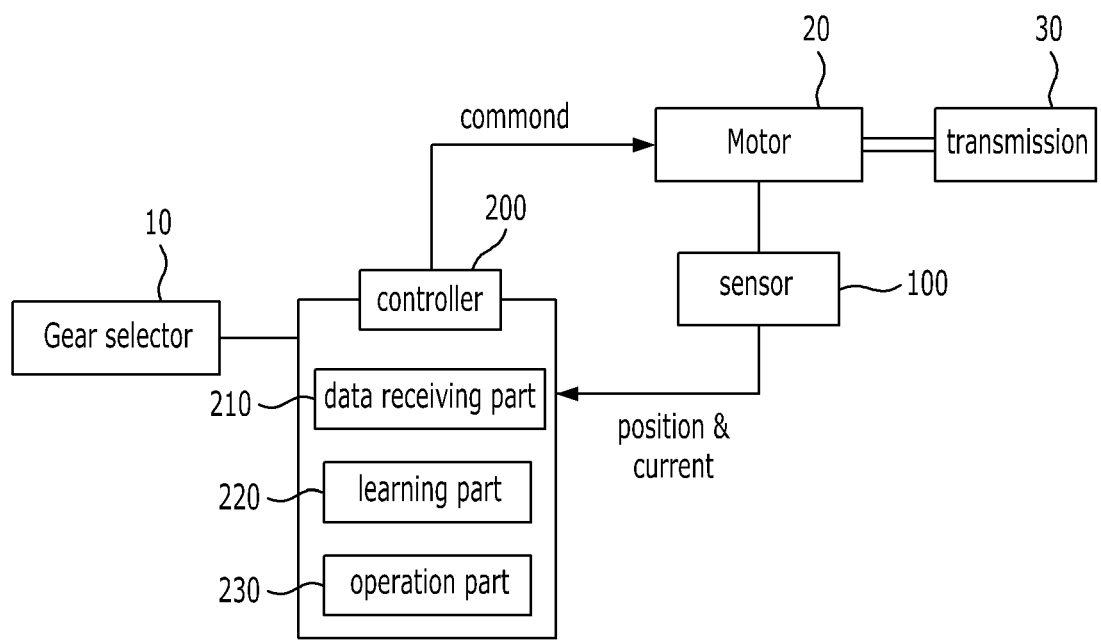
FIG. 3 is a block diagram showing a position learning system for an electric shift-by-wire system according to a first embodiment of the present invention.
Figure 4:
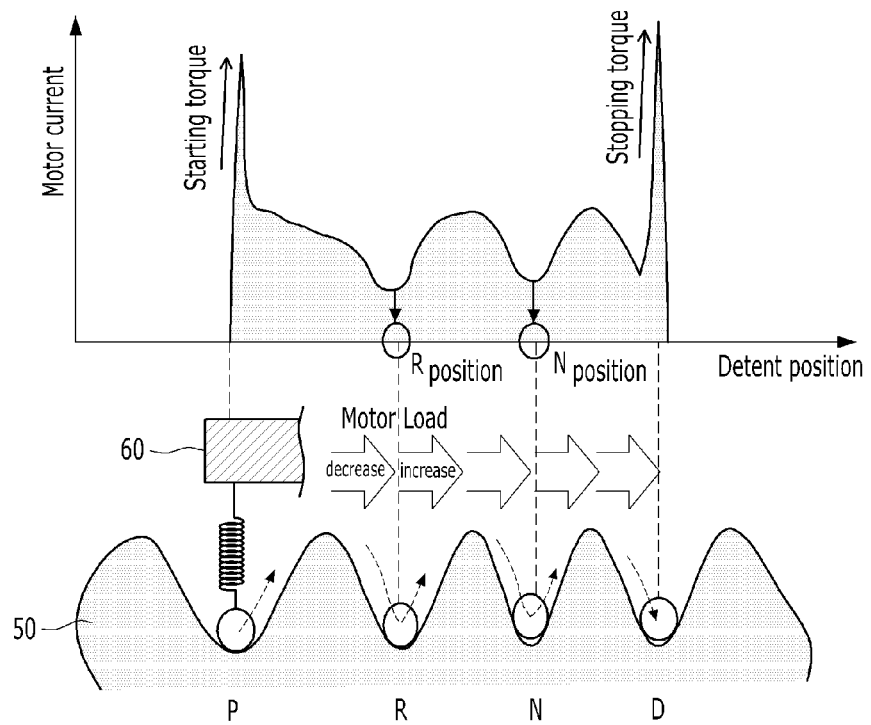
FIG. 4 is a graph showing variations of current data according to rotation of the detent plate in the position learning system according to the first embodiment of the present invention.
Figure 5:
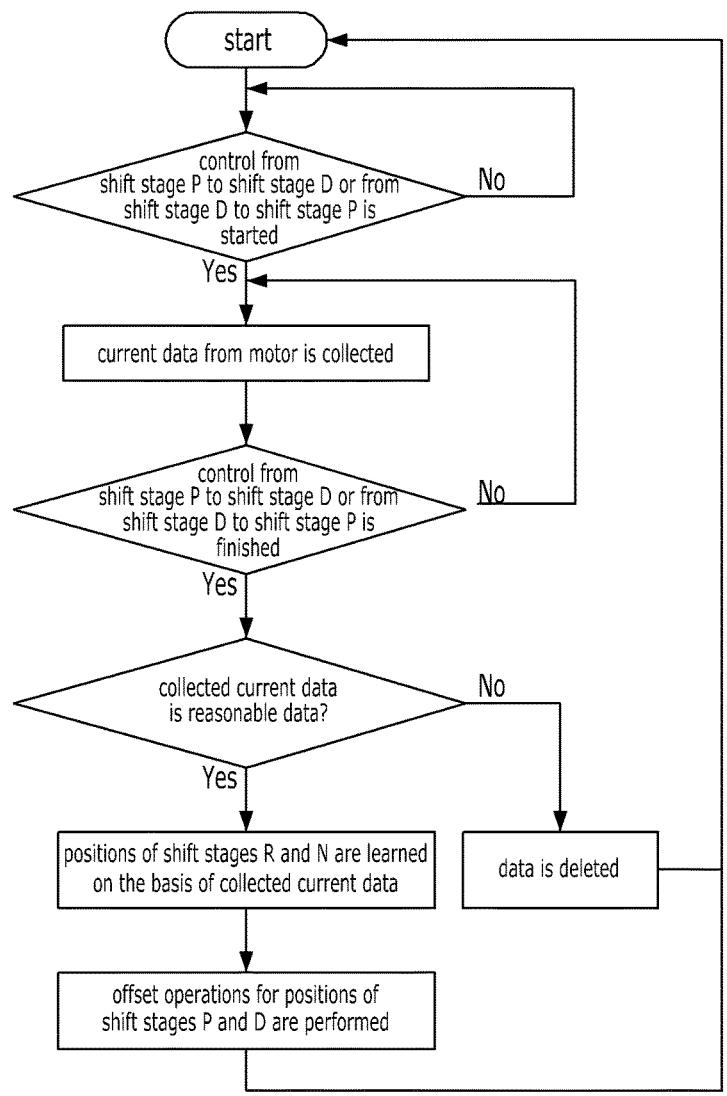
FIG. 5 is a flowchart showing a process of learning positions of shift stages in the position learning system according to the first embodiment of the present invention.

FIG. 3 is a block diagram showing a position learning system for an electric shift-by-wire system according to a first embodiment of the present invention, FIG. 4 is a graph showing variations of current data according to rotation of a detent plate in the position learning system according to the first embodiment of the present invention, and FIG. 5 is a flowchart showing a process of learning positions of shift stages in the position learning system according to the first embodiment of the present invention.

The present invention relates to the position learning system for an electric shift-by-wire system that is capable of sensing changes in the load of a motor 20 according to operations of a four-stage detent plate 50 and a detent spring 60 to learn positions of shift stages of the electric shift-by-wire system, and in detail, the position learning system includes a sensor 100 for sensing the current generated from the motor and a controller 200 for receiving current data until a shift stage P is switched to a shift stage D or the shift stage D is switched to the shift stage P from the sensor 100, learning positions of shift stages R and N through the received current data, and performing offset operations on the basis of the learned positions of the shift stages R and N to learn positions of the shift stages P and D.

At this time, the four-stage detent plate 50 is a detent plate having four valleys corresponding to the shift stages P, R, N, and D, and hereinafter, the four-stage detent plate 50 will be used with the same meaning as above.

Referring in detail to the components of the position learning system according to the first embodiment of the present invention, the sensor 100 is a kind of a current sensor which serves to sense an amount of current generated from the motor 20, and data (hereinafter, referred to as current data) related to the amount of current generated from the motor 20, which is sensed by the sensor 100, is transmitted to the controller 200 as will be discussed later and is thus utilized in learning positions of the shift stages.

As this time, the current sensor as the sensor 100 is just one example, and therefore, only if the sensor 100 senses the amount of current generated from the motor 20, it may be used with other kinds of sensors, without being limited thereto.

Next, the controller 200 serves to learn the positions of the shift stages P, R, N and D on the basis of the current data until the shift stage P is switched to the shift stage D or until the shift stage D is switched to the shift stage P, which has been received from the sensor 100, thereby accurately recognizing an absolute position (angle of rotation) of the motor 20.

In detail, the controller 200 learns the positions of the shift stages P, R, N and D through a data receiving part 210, a learning part 220, and an operation part 230, and as shown in FIG. 4, the data receiving part 210 serves to calculate a low point and a high point of the current data on the basis of the current data until the shift stage P is switched to the shift stage D or until the shift stage D is switched to the shift stage P, which has been received from the sensor 100, and to thus determine whether the calculated low point and high point of the current data are reasonable data.

At this time, if the calculated low point and high point of the current data are positioned within a predetermined allowable range, the data receiving part 210 determines that the low point and high point of the current data are reasonable data, and the allowable range, which is used to determine whether the low point and high point of the current data are reasonable data, is a tolerance value set in a manufacturing process between the detent plate 50 and the detent spring 60, which is stored in an electronic control unit (ECU). The data receiving part 210 retrieves a value of the allowable range stored in the ECU and utilizes the value at the time when it is determined whether the current data is reasonable data.

For example, it is assumed that an allowable range of the low point of the current data is set to the range of 0.9 to 1.1, and if the low point of the current data calculated in the data receiving part 210 is 1, the data receiving part 210 determines that the low point of the current data is reasonable. Contrarily, if the low point of the current data calculated in the data receiving part 210 is 0.8, the data receiving part 210 determines that the low point of the current data is not reasonable and thus deletes the current data received from the sensor 100.

Next, if it determined through the data receiving part 210 that the low point and the high point of the current data are reasonable data, the learning part 220 serves to learn positions of the shift stages R and N from the low point of the current data.

In more detail, the four-stage detent plate 50 has five hills and four valleys, and as the detent plate 50 is rotated, as mentioned above, a gap between the detent spring 60 and the detent plate 50 becomes changed to cause the amount of current generated from the motor 20 to be varied.

If the detent spring 60 is located at the valley of the detent plate 50 corresponding to the shift stage P (or D), the motor 20 is not rotated anymore, so that a large load is applied to the motor 20. In case where the detent spring 60 is located at the valley of the detent plate 50 corresponding to the shift stage P, as shown in FIG. 4, a large amount of current (around starting torque in FIG. 4) is sensed by the sensor 100.

In a process where the shift stage P is switched to the shift state D, the detent spring 60 is necessarily passed through the valleys of the detent plate 50 corresponding to the shift stages R and N, and if the detent spring 60 is located at the valleys of the detent plate 50 corresponding to the shift stages R and N, amounts of current generated from the motor 20 become small, so that the learning part 220 learns a position of a low point firstly appearing in the current data during the shift stage P is switched to the shift state D as the shift stage R and learns a position of a low point secondly appearing in the current data during the shift stage P is switched to the shift state D as the shift stage N. Contrarily, the learning part 220 learns a position of a low point firstly appearing in the current data during the shift stage D is switched to the shift state P as the shift stage N and learns a position of a low point secondly appearing in the current data during the shift stage D is switched to the shift state P as the shift stage R.

Next, the operation part 230 serves to perform the offset operations by set values at the shift stages R and N learned by the learning part 220 to learn positions of the shift stages P and D.

As mentioned above, the positions of the shift stages R and N are learned through the low points of the current data, but since the detent plate 50 is not rotated anymore at the shift stages P and D, the positions of the low points of the current data (around starting torque and stopping torque) as shown in FIG. 4 cannot be obviously checked, so that if the positions of the shift stages P and D are learned through the low points of the current data, it is most likely to learn wrong positions.

On the basis of the accurately learned positions of the shift stages R and N through the learning part 220, accordingly, the operation part 230 performs the offset operation by a first value to the left side from the learned position of the shift stage R to learn the position of the shift stage P and performs the offset operation by a second value to the right side from the learned position of the shift stage N to learn the position of the shift stage D, thereby enhancing the accuracy in recognizing a position of the motor.

At this time, the first value for learning the shift stage P is a distance between the valleys of the detent plate 50 corresponding to the shift stages P and R, which is determined in the manufacturing process, and the second value for learning the shift stage D is a distance between the valleys of the detent plate 50 corresponding to the shift stages N and D, which is determined in the manufacturing process. Of course, the first value and the second value may be varied according to the kinds of the detent plate 50 applied to the vehicle.

Figure 6:
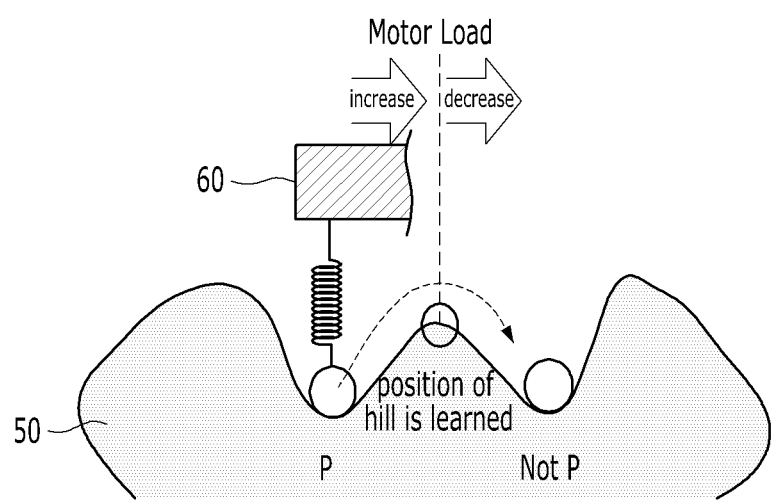
FIG. 6 is a front view showing a process of learning positions of shift stages of a two-stage detent plate in a position learning system for an electric shift-by-wire system according to a second embodiment of the present invention.

Next, an explanation on a position learning system for an electric shift-by-wire system according to a second embodiment of the present invention will be in detail given with reference to FIGS. 3 and 6.

FIG. 6 is a front view showing a process of learning positions of shift stages of a two-stage detent plate in a position learning system for an electric shift-by-wire system according to a second embodiment of the present invention.

According to the second embodiment of the present invention, a position learning system for an electric shift-by-wire, which senses changes in the load of a motor 20 according to operations of a two-stage detent plate 50 and a detent spring 60 and thus learns positions of shift stages, includes a sensor 100 for sensing the current generated from the motor and a controller 200 for receiving current data until a shift stage P is switched to a shift stage (hereinafter, referred to as Not P) which is not the shift stage P or the shift stage (Not P) is switched to the shift stage P from the sensor 100, learning the position of a hill of the detent plate 50 through the received current data, and performing offset operations on the basis of the learned position of the hill of the detent plate 50 to learn positions of the shift stages P and Not P.

At this time, the two-stage detent plate 50 is a detent plate having the shift stages P and Not P, and the position learning system for an electric shift-by-wire system according to the second embodiment of the present invention is different from that according to the first embodiment of the present invention in that the positions of the shift stages are learned on the two-stage detent plate 50.

According to the second embodiment of the present invention, the controller 200 of the position learning system includes a data receiving part 210 for calculating a low point and a high point of the current data on the basis of the current data received from the sensor 100 to determine whether the calculated low point and high point of the current data are reasonable data, a learning part 220 for learning the position of the hill of the detent plate 50 through the high point of the current data if it determined through the data receiving part 210 that the low point and the high point of the current data are reasonable data, and an operation part 230 for performing the offset operations by set values at the position of the hill learned by the learning part 220 to learn the positions of the shift stages P and Not P. At this time, if the calculated low point and high point of the current data are positioned within a predetermined allowable range, the data receiving part 210 determines that the low point and high point of the current data are reasonable data, which is the same as according to the first embodiment of the present invention, and therefore, a detailed explanation on the data receiving part 210 will be avoided for the brevity of the description.

According to the second embodiment of the present invention, the position learning system learns the positions of the shift stages of the two-stage detent plate 50 having the shift stages P and Not P, and accordingly, as shown in FIG. 6, the operation part 230 learns the position of the hill between the shift stages P and Not P of the detent plate 50 through the high point of the current data.

The operation part 230 performs the offset operation by a first value to the left side from the learned position of the hill of the detent plate 50 to learn the position of the shift stage P and performs the offset operation by a second value to the right side from the learned position of the hill of the detent plate 50 to learn the position of the shift stage Not P, thereby allowing the position learning system to accurately recognize a current position of the motor 20.

At this time, the first value is a distance between the shift stage P and the hill of the detent plate 50, which is determined in the manufacturing process, and the second value is a distance between the shift stage Not P and the hill of the detent plate 50, which is determined in the manufacturing process. Of course, the first value and the second value may be varied according to the kinds of the detent plate 50 applied to the vehicle.

Also, as shown in FIG. 6, the shift stage P is located at the left side and the shift stage Not P at the right side around the hill of the two-stage detent plate 50, but the shift stages P and Not P may be changed with each other. In this case, of course, the operation part 230 performs the offset operation by the first value to the right side from the learned position of the hill of the detent plate 50 to learn the position of the shift stage P and performs the offset operation by the second value to the left side from the learned position of the hill of the detent plate 50 to learn the position of the shift stage Not P.

Figure 7:
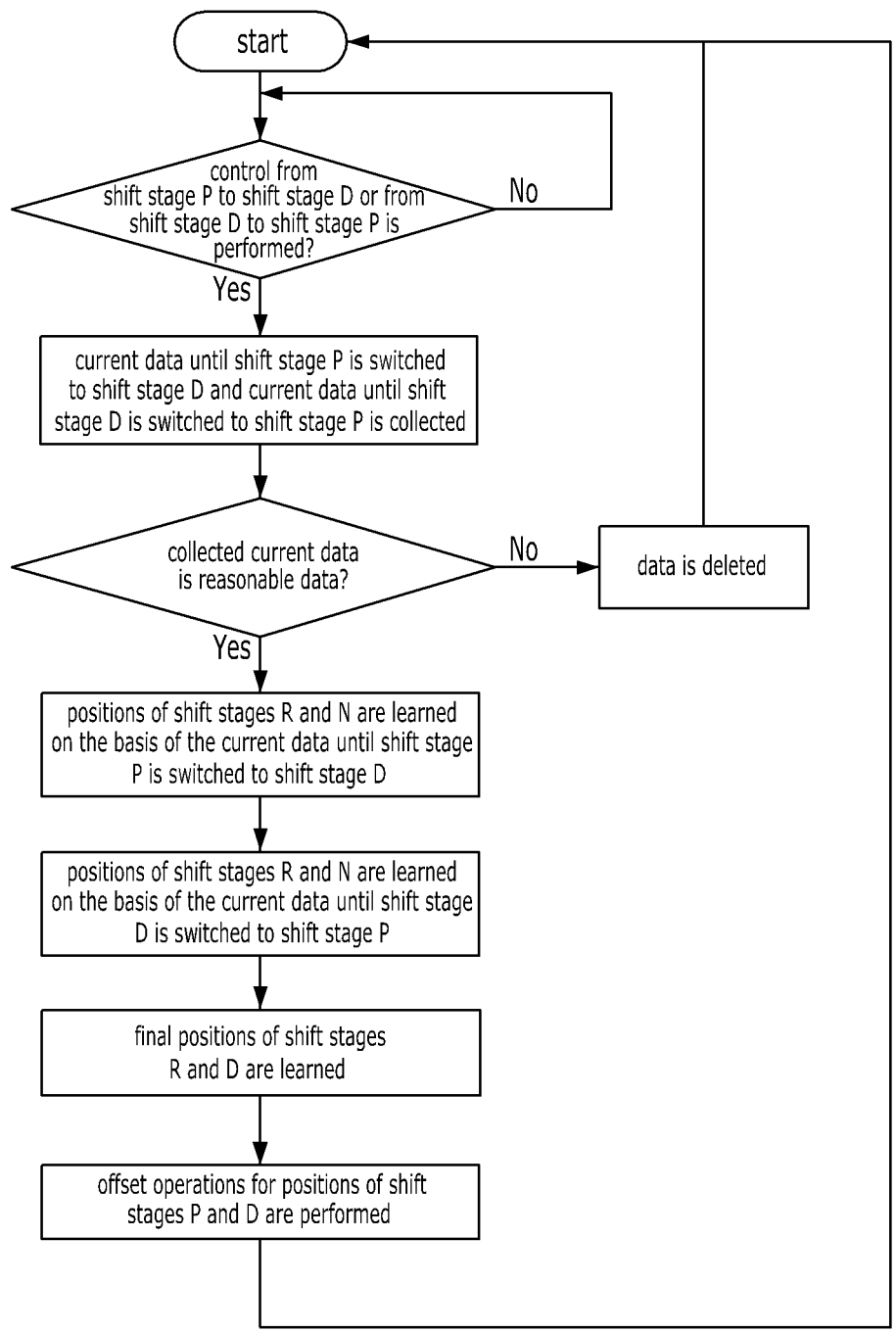
FIG. 7 is a flowchart showing a process of learning positions of shift stages in a position learning system for an electric shift-by-wire system according to a third embodiment of the present invention.

Lastly, an explanation on a position learning system for an electric shift-by-wire system according to a third embodiment of the present invention will be in detail given with reference to FIGS. 3 and 7.

FIG. 7 is a flowchart showing a process of learning positions of shift stages in a position learning system for an electric shift-by-wire system according to a third embodiment of the present invention.

According to the third embodiment of the present invention, a position learning system for an electric shift-by-wire, which senses changes in the load of a motor 20 according to operations of a four-stage detent plate 50 and a detent spring 60 and thus learns positions of shift stages, includes a sensor 100 for sensing the current generated from the motor and a controller 200 for receiving current data until a shift stage P is switched to a shift stage D and the shift stage D is switched back to the shift stage P from the sensor 100, learning positions of shift stages R and N through the current data at the time when the shift stage P is switched to the shift stage D and the current data at the time when the shift stage D is switched back to the shift stage P, and performing offset operations on the basis of the learned positions of the shift stages R and N to learn positions of the shift stages P and D.

In this case, the controller 200 includes a data receiving part 210 for calculating a low point and a high point of the current data on the basis of the current data received from the sensor 100 to determine whether the calculated low point and high point of the current data are reasonable data, a learning part 220 for learning the positions of the shift stages R and N through the low point of the current data if it determined through the data receiving part 210 that the low point and the high point of the current data are reasonable data, and an operation part 230 for performing offset operations by set values at the positions of the shift stages R and N learned by the learning part 220 to learn positions of the shift stages P and D, which is the same as according to the first embodiment of the present invention.

However, the position learning system according to the third embodiment of the present invention is different from that according to the first embodiment of the present invention in that the positions of the shift stages R and N are learned on the basis of all of the current data until the shift stage P is switched to the shift stage D and the shift stage D is switched back to the shift stage P, not on the basis of the current data until the shift stage P is switched to the shift stage D or the shift stage D is switched to the shift stage P.

In more detail, the position learning system according to the present invention senses the current through the sensor 100, and if current measurement or filtering is delayed in the sensor 100, accordingly, the position of the low point or high point of the current data may be delayed.

According to the third embodiment of the present invention, the learning part 220 of the position learning system learns positions of a first shift stage R and a first shift stage N on the basis of the current data until the shift stage P is switched to the shift stage D, learns positions of a second shift stage R and a second shift stage N on the basis of the current data until the shift stage D is switched back to the shift stage P, and calculates average values between the first shift stages R and N and the second shift stages R and N to learn positions of final shift stages R and N, so that the delay occurring in the process where the shift stage P is switched to the shift stage D can be offset by the delay occurring in the process where the shift stage D is switched to the shift stage P, thereby allowing the position learning system to more accurately learn the positions of the shift stages R and N.

Also, the operation part 230 performs the offset operation by a first value to the left side from the learned position of the shift stage R to learn the position of the shift stage P and performs the offset operation by a second value to the right side from the learned position of the shift stage N to learn the position of the shift stage D, which is the same as according to the first embodiment of the present invention, and therefore, a detailed explanation on the operation of the operation part 230 will be avoided.

As described above, the position learning system for an electric shift-by-wire system according to the embodiments of the present invention can learn the positions of the specific shift stages (R and N) on the basis of the load of the motor and perform the offset operations at the learned position of the specific shift stages to recognize the positions of the remaining shift stages (P and D), so that unlike the conventional position learning system where the motor has to be driven to learn the position thereof, the position learning system according to the present invention can learn a current position of the motor in a more simple and accurate manner.

As the position of the motor can be obviously recognized through the position learning system according to the embodiments of the present invention, particularly, a time point at which an electrical signal is applied to the motor is accurately set to control the electric shift-by-wire system in a more precise and reliable manner.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above teachings. It is therefore intended that the scope of the invention be limited not by this detailed description, but rather by the claims appended hereto.

Terms used in this application are used to only describe specific exemplary embodiments and are not intended to restrict the present invention. An expression referencing a singular value additionally refers to a corresponding expression of the plural number, unless explicitly limited otherwise by the context.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A position learning system for an electric shift-by-wire system, which senses changes in the load of a motor according to operations of a four-stage detent plate and a detent spring to learn positions of shift stages of the electric shift-by-wire system, the position learning system comprising:
   a sensor for sensing the current generated from the motor; and
   a controller for receiving current data until a shift stage P (Parking) is switched to a shift stage D (Drive) or the shift stage D is switched to the shift stage P from the sensor, learning positions of shift stages R (Reverse) and N (Neutral) through the received current data, and performing offset operations on the basis of the learned positions of the shift stages R and N to learn positions of the shift stages P and D.

2. The position learning system according to claim 1, wherein the controller comprises:
   a data receiving part for calculating a low point and a high point of the current data on the basis of the current data received from the sensor to determine whether the calculated low point and high point of the current data are reasonable data;
   a learning part for learning the positions of the shift stages R and N through the low point of the current data if it determined through the data receiving part that the low point and the high point of the current data are reasonable data; and
   an operation part for performing the offset operations by set values at the positions of the shift stages R and N learned by the learning part to learn the positions of the shift stages P and D.

3. The position learning system according to claim 2, wherein the data receiving part determines that the low point and high point of the current data are reasonable data if the calculated low point and high point of the current data are positioned within a predetermined allowable range.

4. The position learning system according to claim 1, wherein the controller receives current data until the shift stage P is switched to the shift stage D and the shift stage D is switched back to the shift stage P from the sensor, learning positions of shift stages R and N through the current data at the time when the shift stage P is switched to the shift stage D and the current data at the time when the shift stage D is switched back to the shift stage P, and performing offset operations on the basis of the learned positions of the shift stages R and N to learn the positions of the shift stages P and D.

5. The position learning system according to claim 4, wherein the controller comprises:
   a data receiving part for calculating a low point and a high point of the current data on the basis of the current data received from the sensor to determine whether the calculated low point and high point of the current data are reasonable data;
   a learning part for learning the positions of the shift stages R and N through the low point of the current data if it determined through the data receiving part that the low point and the high point of the current data are reasonable data; and
   an operation part for performing the offset operations by set values at the positions of the shift stages R and N learned by the learning part to learn the positions of the shift stages P and D.

6. The position learning system according to claim 5, wherein the learning part learns positions of a first shift stage R and a first shift stage N on the basis of the current data until the shift stage P is switched to the shift stage D, learns positions of a second shift stage R and a second shift stage N on the basis of the current data until the shift stage D is switched back to the shift stage P, and calculates average values between the first shift stages R and N and the second shift stages R and N to learn positions of final shift stages R and N.

7. The position learning system according to claim 2, wherein the operation part performs the offset operation by a first value to the left side from the learned position of the shift stage R to learn the position of the shift stage P and performs the offset operation by a second value to the right side from the learned position of the shift stage N to learn the position of the shift stage D.

8. The position learning system according to claim 5, wherein the operation part performs the offset operation by a first value to the left side from the learned position of the shift stage R to learn the position of the shift stage P and performs the offset operation by a second value to the right side from the learned position of the shift stage N to learn the position of the shift stage D.

\* \* \* \* \*